(12) United States Patent
Liu et al.

(10) Patent No.: US 10,437,393 B2
(45) Date of Patent: Oct. 8, 2019

(54) PROTECTIVE CASE FOR AN ELECTRONIC DEVICE AND AN INPUT METHOD USING THE SAME

(71) Applicant: SAMSUNG ELECTRONICS CO., LTD., Suwon-si (KR)

(72) Inventors: Jie Liu, Guangzhou (CN); Xingong Xu, Guangzhou (CN); Jae-sun Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 160 days.

(21) Appl. No.: 14/689,644

(22) Filed: Apr. 17, 2015

(65) Prior Publication Data

US 2015/0301655 A1  Oct. 22, 2015

(30) Foreign Application Priority Data

Apr. 17, 2014 (CN) .......................... 2014 1 0156207
Aug. 8, 2014 (CN) .......................... 2014 1 0389460

(51) Int. Cl.
*G06F 3/044* (2006.01)
*G06F 1/16* (2006.01)

(52) U.S. Cl.
CPC ............ *G06F 3/044* (2013.01); *G06F 1/1613* (2013.01); *G06F 1/1626* (2013.01); *G06F 1/1628* (2013.01); *G06F 2200/1636* (2013.01)

(58) Field of Classification Search
CPC ...... G06F 3/0216; G06F 3/023; G06F 3/0224; G06F 1/1664; G06F 1/1669; G06F 1/1671; G06F 1/1666
See application file for complete search history.

(56) References Cited

U.S. PATENT DOCUMENTS

| 9,801,442 B2 | 10/2017 | Oh et al. |
| 2003/0095374 A1 | 5/2003 | Richardson |
| 2009/0128503 A1* | 5/2009 | Grant ...................... G06F 3/016 345/173 |
| 2011/0090626 A1 | 4/2011 | Hoellwarth et al. |
| 2011/0248947 A1* | 10/2011 | Krahenbuhl .......... G06F 1/1626 345/174 |

(Continued)

FOREIGN PATENT DOCUMENTS

| CN | 203028383 U | 7/2013 |
| CN | 203399163 U | 1/2014 |

(Continued)

OTHER PUBLICATIONS

Communication dated Sep. 9, 2015, issued by the European Patent Office in counterpart European Application No. 15163891.3.

(Continued)

*Primary Examiner* — Nitin Patel
*Assistant Examiner* — Amen Woldesenbet Bogale
(74) *Attorney, Agent, or Firm* — Sughrue Mion, PLLC (57) ABSTRACT

A protective case for an electronic device and an input method using the same, the protective case includes a front cover for covering a touch screen of the electronic device, and a conductive layer for generating a touch input, wherein the conductive layer at least includes a first conductive layer provided on the front cover. The protective case according to present disclosure may perform operation on the touch screen.

16 Claims, 7 Drawing Sheets

(56) References Cited

U.S. PATENT DOCUMENTS

| | | | |
|---|---|---|---|
| 2011/0267274 A1* | 11/2011 | Shusteri | G06F 3/0219 |
| | | | 345/168 |
| 2011/0279902 A1 | 11/2011 | Freeman et al. | |
| 2012/0051021 A1 | 3/2012 | Ohsawa et al. | |
| 2012/0086642 A1* | 4/2012 | Weihe | G06F 3/0202 |
| | | | 345/168 |
| 2012/0287051 A1* | 11/2012 | Takabu | G06F 3/0202 |
| | | | 345/169 |
| 2012/0306755 A1* | 12/2012 | Lin | G06F 3/04886 |
| | | | 345/168 |
| 2013/0038549 A1* | 2/2013 | Kitada | G06F 3/0338 |
| | | | 345/173 |
| 2013/0042581 A1 | 2/2013 | Holben et al. | |
| 2013/0335364 A1* | 12/2013 | Tseng | G06F 1/16 |
| | | | 345/174 |
| 2014/0354570 A1* | 12/2014 | Makinen | G06F 3/041 |
| | | | 345/173 |
| 2016/0358737 A1* | 12/2016 | Brooks | H01H 13/52 |

FOREIGN PATENT DOCUMENTS

| | | |
|---|---|---|
| CN | 203522828 U | 4/2014 |
| JP | 2012-45153 A | 3/2012 |
| KR | 10-2013-0125650 A | 11/2013 |
| KR | 20-0470477 Y1 | 12/2013 |

OTHER PUBLICATIONS

Communication dated Oct. 19, 2015, issued by the European Patent Office in counterpart European Application No. 15163891.3.
Communication dated Jul. 2, 2015, issued by the State Intellectual Property Office of the People's Republic of China in counterpart Chinese Patent Application No. 201410389460.8.

* cited by examiner

PROTECTIVE CASE FOR AN ELECTRONIC DEVICE AND AN INPUT METHOD USING THE SAME

CROSS-REFERENCE TO RELATED APPLICATIONS

This application claims priority from Chinese Patent Application No. 201410156207.8, filed on Apr. 17, 2014, and Chinese Patent Application No. 201410389460.8, filed on Aug. 8, 2014, with the Chinese Intellectual Property Office, the entire contents of which are incorporated herein by reference.

BACKGROUND

Technical Field

The present invention relates to a protective case of electronic device. More particularly, the present invention relates to a protective case capable of generating touch input of the touch screen of the electronic device and an input method using said protective case.

Background Art

With the advance of technology, various electronic devices (e.g. mobile phone, game console, camera, multi-media terminal and so on) have entered every fields of society. In order to effectively protect the touch screen of the electronic device, various protective cases for the electronic device have appeared on market. The touch screen can be covered by the protective case when not in usage, hence preventing damage to the touch screen. However, most of the protective cases may only provide protection to the touch screen, while the user cannot perform any operation on the touch screen when it is covered by the protective case.

New protective cases have been developed lately to allow operation on the touch screen with the presence of the protection case, in which a window is left on the front cover of the protective case so that the user may perform operation on the touch screen through said window. However, such kind of protective case may no longer protect the region where the window is situated, also, the functions that can be executed through such window region are also very limited.

Accordingly, there is a need for a protective case that will allow the user to operate the touch screen freely while providing effective protection to the touch screen.

SUMMARY

The present invention aims to a protective case capable of generating a touch input of a touch screen of an electronic device. When mounting the protective case on the electronic device, a touch input can be generated by pressing the front cover of the protective case which covers the touch screen.

An aspect of the present invention provides a protective case for an electronic device, including a front cover for covering a touch screen of the electronic device, wherein, the protective case includes a conductive layer for generating a touch input, and the conductive layer at least includes a first conductive layer disposed at the front cover.

A region of the front cover where the first conductive layer is disposed may be partially or entirely elastic.

An area of the conductive layer may be larger than a first predetermined area.

The conductive layer may further include a second conductive layer which is disposed at a position different from that of the first conductive layer, the second conductive layer is electrically connected with the first conductive layer, and a sum of areas of the first and second conductive layers is larger a first predetermined area.

The protective case may further include an interface for connecting a ground terminal of the electronic device, and the conductive layer is electrically connected with the interface.

The first conductive layer may include a plurality of conductive regions and a connecting wire for electrically connecting the adjacent conductive regions.

An area of each conductive region may be larger than a second predetermined area, and the second predetermined area may be smaller than the first predetermined area.

A width of the connecting wire may be smaller than a predetermined value.

The protective case may further include a protective layer, and the first conductive layer is disposed between the protective layer and an inner side of the front cover.

The conductive region may include an inward protrusion which is disposed in a groove formed on an inner surface of the front cover, and a hole for containing the connecting wire is provided in a side wall of the groove.

A protective layer may be covered on an opening of the groove.

A surface, which is close to the inner surface of the front cover, of each conductive region may be formed into an arc shape; the groove may include an arc portion having an arc shape matching with the arc surface of the conductive region, horizontal extension portions extending outwards from an edge of the arc portion, and vertical extension portions extending vertically from an outer end of the horizontal extension portions; an insulating layer may be covered on an opening of the groove, the insulating layer may be hollowed at a position overlapping the protrusion, the insulating layer may be coupled to the horizontal extension portions and the vertical extension portions, the connecting wire may be disposed between the insulating layer and the horizontal extension portions, and the vertical extension portions may be provided with a hole for containing the connecting wire.

A protective layer may be disposed in the hollowed position of the insulating layer.

An area of the protrusion may be larger than a second predetermined area.

A support plate may be formed at an inner side of the front cover of the protective case, the first conductive layer may be formed on the support plate, and each conductive region of the first conductive layer may include a first portion, a second portion and a third portion, the first portion, the second portion and the connecting wire may be arranged at a side of the support plate facing an inner surface of the front cover, the third portion may be arranged at the other side of the support plate, the first portion and the third portion may be electrically connected, and the second portion may be electrically connected with the connecting wire; a key may be arranged above the first portion; the second portion may surround the first portion, and the first portion and the second portion may be electrically connected through the key when the key is pressed.

An area of the third portion may be larger than a second predetermined area.

The key may be embedded in the front cover such that the key is able to be pressed from an outer side of the front cover.

The front cover may include a first leather layer, a base layer and the support plate, wherein the base layer is provided between the first leather layer and the support plate, and the key is embedded in the first leather layer and the base layer.

A visible identifier may be provided on the key.

The front cover may be partially or entirely transparent.

A position of the front cover where each of the conductive regions is located may be transparent.

A position of an outer side of front cover overlapped with each of the conductive regions may be provided with a visible identifier.

The visible identifier may be hollowed out.

A position of the front cover overlapped with a physical key of a front of the electronic device may be provided with a key.

A position of at least one conductive region of the protective case may correspond to a position of a touch function region on a touch screen of the electronic device in the case where the protective case is mounted on the electronic device.

The conductive layer may be of a material having an electrical characteristic similar to that of finger skin.

The conductive layer may be of a material of metallic conductor or semiconductor.

The conductive layer may be formed by at least one of the platinum, aluminum, copper, silver, carbon and indium tin oxide.

In generating the touch input, a part of or the entire conductive layer may move toward a touch screen surface of the electronic device when being pressed by any object, so as to contact the touch screen directly or indirectly.

Another aspect of the present invention provides a method of inputting on an electronic device having a capacitive touch screen through the above protective case, wherein the protective case is mounted on the electronic device, and the front cover of the protective case is covered on the touch screen; the method comprising: receiving a request for performing a touch input by using the protective case; generating a predetermined interface having at least one touch function region in response to the request, wherein each position of the at least one touch function region corresponds to a position of a conductive region of the protective case; receiving the touch input generated by contact between the conductive region and the touch function region, wherein the contact is caused by pressing a position of the front cover of the protective case overlapped with the conductive region.

The predetermined interface may be an interface of phone application.

The at least one touch function region may include touch function regions for inputting dial information and performing dial function.

The receiving the request for performing the touch input by using the protective case includes: receiving an input through a predetermined physical key or a predetermined sensor.

The predetermined sensor may be a distance sensor and/or an acceleration sensor.

Another aspect of the present invention provides an electronic device having a touch screen, which includes the protective case.

The protective case according to the present invention may not only provide effective protection for the touch screen, but also allows various operations to be performed on the touch screen.

Other aspects and/or advantages of the present invention will be partially illustrated in the following description, and the rests will be clarified through further description or implementation of the present invention.

BRIEF DESCRIPTION OF THE DRAWINGS

These and other targets, features and advantages of the invention will become apparent and more readily appreciated from the following description, taken in conjunction with the accompanying drawings in which.

DETAILED DESCRIPTION OF EXEMPLARY EMBODIMENTS

Here, different exemplary embodiments will be described more sufficiently with reference to the drawings, wherein some exemplary embodiments will be illustrated in the drawings. In the drawings, the same numeral reference indicates the same component or element.

A protective case according to the present invention includes a conductive layer for generating a touch input. The conductive layer (for example, a part of the conductive layer) may contact a touch screen under an action of a user (such as pressing), so as to generate the touch input.

The touch screen of the electronic device is normally a capacitive touch screen. When performing input through the touch screen, a high frequency alternating current will be generated at a touch position, and the touch screen will detect the touch input by detecting the generated high frequency alternating current. A necessary condition for generating the high frequency alternating current at the touch position is that a potential of an object touching the touch screen should be sufficiently low. Therefore, a capacitance between the object and ground should be sufficiently large. Accordingly, in order to generate touch input on the touch screen by using the conductive layer of the protective case, an area of the conductive layer should be larger than a certain threshold (hereinafter referred to as first predetermined area), so that the capacitance between the conductive layer and the ground should be sufficiently large. Regarding different materials of the touch screen and conductive layer, the first predetermined area can be determined through experiments. For example, in order to design a protective case of a mobile phone of certain model, under the premise of having determined the material of the conductive layer, a smallest area of the conductive layer being able to trigger the touch screen can be determined as the first predetermined area by contacting the touch screen with conductive layers having different areas. The protective case according to the present invention includes a front cover for covering the touch screen of the electronic device. The conductive layer can be partially or entirely disposed at an inner side (that is, a side near the touch screen when front cover covers the touch screen normally) of the front cover of the protective case. When the user presses the outer side of the front cover of the protective case (that is, a side facing the user when the front cover covers the touch screen normally) so that the conductive layer disposed at the front cover of the protective case contacts the touch screen of the electronic device directly or indirectly, a touch operation to the touch screen can be generated.

Material having an electrical characteristic similar to that of finger skin can be used as a material of the conductive layer.

In addition, the conductive layer can be of the material of metallic conductor or semiconductor. For example, the conductive layer is formed by at least one of platinum, aluminum, copper, silver, carbon and indium tin oxide.

Figure 1A:
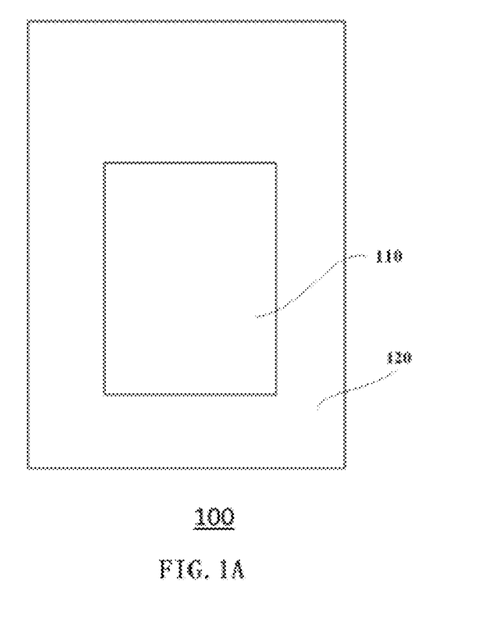
FIG. 1A shows a front view of a front cover of a protective case of an electronic device according to the exemplary embodiment of the present invention.

FIG. 1A shows a front view of a front cover of a protective case of an electronic device according to an exemplary embodiment of the present invention.

As shown in FIG. 1A, the conductive layer 110 is disposed at an inner side of the front cover 100. Although FIG. 1A shows that the inner side of the front cover 100 is partially provided with the conductive layer 110, the present invention is not limited thereto, and the inner side of the front cover 100 may be entirely provided with the conductive layer 110.

Hereinafter, side views based on some examples of the front cover of the protective case of FIG. 1A are described in conjunction with FIGS. 1B-1D.

Figure 1B:
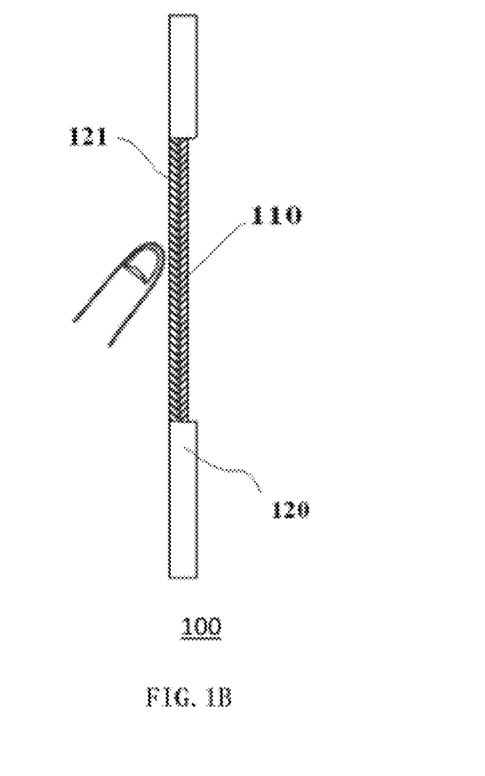
FIG. 1B shows a side view of a front cover of a protective case of an electronic device according to a first exemplary embodiment of the present invention.

FIG. 1B shows a side view of the front cover of the protective case of the electronic device according to a first exemplary embodiment of the present invention.

As shown in FIG. 1B, a groove is formed at the inner side of the front cover 100 of the protective case, and the conductive layer 110 is arranged in the groove, which is lower than an inner surface of the front cover 100.

A portion 121, provided with the first conductive layer, of the front cover and the conductive layer 110 are partially or entirely elastic. For example, the portion 121 and the conductive layer 110 can be partially or entirely formed of elastic material or elastic structure.

When one or more positions of the front cover are elastic, positions of the elastic portions may correspond to predetermined touch function regions on an interface displayed by the touch screen. The touch function region refers to a region which can be triggered upon being touched so as to generate corresponding input (such as various functional commands and character, etc.).

For example, the groove can be formed in a base layer 120 of the front cover 100. The base layer 120 is used to constitute a base body of the front cover of the protective case, an outer side of the base layer is formed into the outer side of the front cover, and the conductive layer 110 is arranged in the groove of an inner side of the base layer 120. The base layer 120 can be made of various materials that are used for manufacturing the protective case. The portion 121 for forming the groove of the base layer 120 is coupled together with the conductive layer 110.

When, for example, the portion 121 of the outer side of the front cover 100 is pressed by finger, the conductive layer of the pressed position may contact the touch screen, so as to generate a touch input. Before the pressing operation, the conductive layer 110 is not in contact with the touch screen.

Preferably, the portion provided with the conductive layer 110 on the front cover can be made of transparent material. Specifically speaking, the conductive layer 110 and the portion 121 of the base layer 120 coupled to the conductive layer can be made of transparent material. In this way, a portion of the touch screen on which touch input can be performed through the protective case and content displayed thereon can be seen, so as to facilitate inputting. Optionally, the entire front cover can be made of transparent material.

In addition, a region of the outer side of the front cover overlapped with the conductive layer 110 may be provided with a visible identifier or identifiers, and a position of the identifier may correspond to a predetermined touch function region on the interface displayed by the touch screen. The identifier can be provided in different ways, such as printing, etching, adhering and hollowing out, etc. Preferably, the visible identifier can be provided when the front cover is not transparent, so as to help the user to determine the pressing position.

In the examples as shown in FIGS. 1A and 1B, the conductive layer 110 is set to be lower than the inner surface of the front cover 100, so that it may not contact the touch screen when not being pressed. However, the present invention is not limited thereto, and one can adopt other means to allow the conductive layer 110 to contact the touch screen when being pressed and not to contact the touch screen when not being pressed.

Figure 1C:
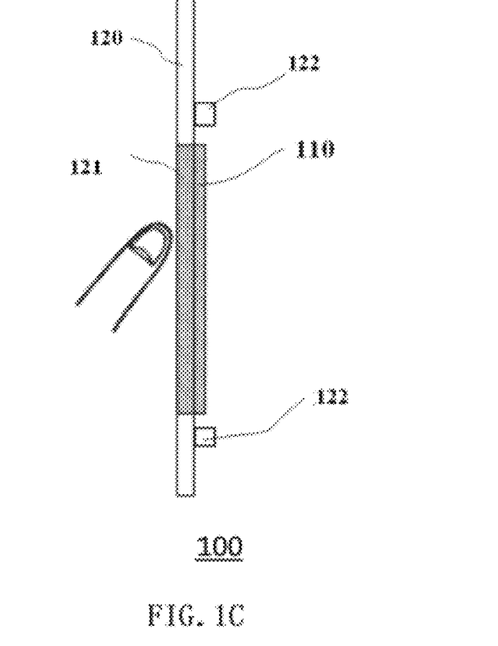
FIG. 1C shows a lateral view of a front cover of a protective case of an electronic device according to a second exemplary embodiment of the present invention.

FIG. 1C shows a side view of the front cover of the protective case of the electronic device according to a second exemplary embodiment of the present invention.

As shown in FIG. 1C, a support wall or support point 122 is provided on the inner side of the front cover (for example, the inner surface of the base layer 120), the support wall 122 is higher than the conductive layer 110, so that the conductive layer 110 may not contact the touch screen when not being pressed.

Figure 1D:
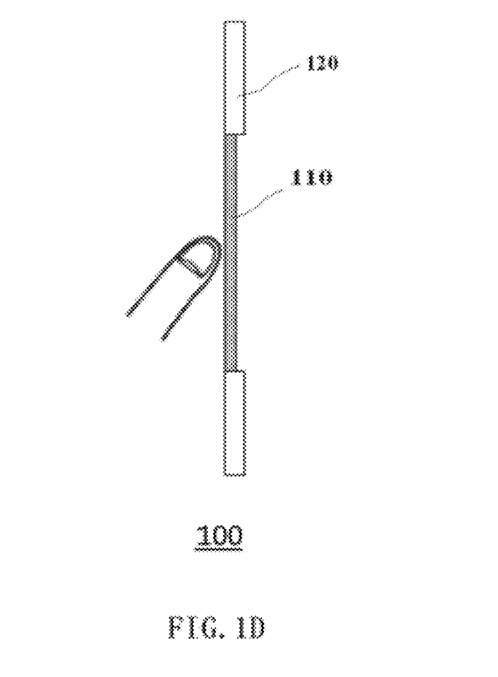
FIG. 1D shows a lateral view of a front cover of a protective case of an electronic device according to a third exemplary embodiment of the present invention.

FIG. 1D shows a side view of the front cover of the protective case of the electronic device according to a third exemplary embodiment of the present invention.

As shown in FIG. 1D, the base layer 120 includes a window for containing the conductive layer 110. The inner surface of the conductive layer 110 is lower than the inner surface of the base layer, and the outer surface of the conductive layer 110 and the outer surface of the base layer 120 are coplanar. It should be understood that the outer surface of the conductive layer 110 and the outer surface of the base layer 120 may not be coplanar as well.

In addition, the front cover provided with the conductive layer can be partially (or locally) designed to be elastic as needed. In this case, the touch input can be generated only when an outer side portion of the front cover 100 corresponding to a part of the conductive layer is pressed. An embodiment of such scenario will be described hereby with reference to FIG. 2.

Figure 2:
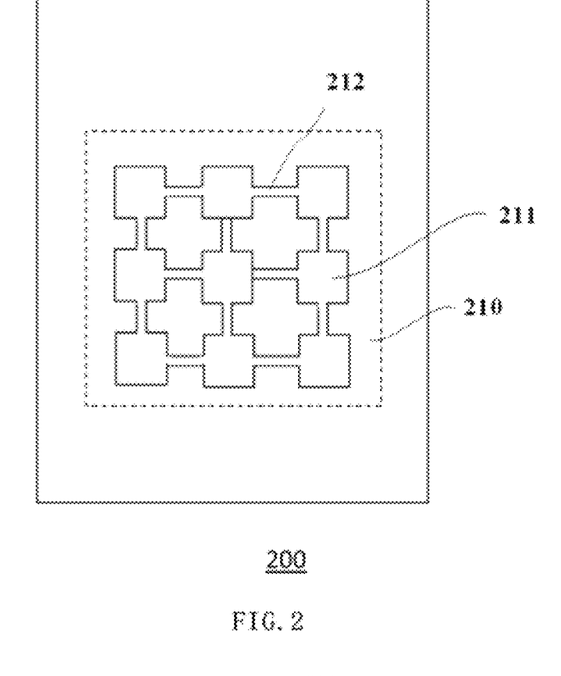
FIG. 2 shows a schematic diagram of a front cover of a protective case of an electronic device according to a fourth exemplary embodiment of the present invention.

FIG. 2 shows a schematic diagram of the front cover of the protective case of the electronic device according to a fourth exemplary embodiment of the present invention. As shown in FIG. 2, a conductive layer 210 (within the dashed box) is arranged at an inner side of a front cover 200 of the protective case, and the conductive layer 210 includes a plurality of conductive regions 211 and connecting wire(s) 212 for electrically connecting the adjacent conductive regions. An area of the conductive layer 210 is larger than the first predetermined area.

A part of front cover provided with the conductive region 211 is elastic, while a part of front cover provided with the connecting wire 212 is made of hard materials. For example, when the front cover 200 includes the conductive layer 210 and a base layer for supporting the conductive layer 210, and when an outer surface of the conductive layer 210 and an inner surface of the base layer are coupled together, the conductive region 211 and the portion of the base layer coupling with the conductive regions 211 are elastic; when the conductive regions 211 are formed in the front cover in a manner similar to that of FIG. 1D, the conductive regions 211 can be set to be elastic. In this way, the touch input can be generated only when pressing the outer side portion of the front cover 200 corresponding to the conductive region 211 (for example, the portion of the base layer overlapping the conductive regions 211, or the conductive regions 211 themselves). In this way, erroneous input can be effectively prevented.

In addition, in order to realize the touch operation on the touch screen, besides the object contacting the touch screen may have a sufficiently low potential, the contact area (hereinafter referred to as second predetermined area) between said object and the touch screen should also reach a certain amount, otherwise, the touch screen may not recognize the touch. Accordingly, the area of each conductive region 211 should be at least larger than the second predetermined area. The second predetermined area is smaller than the first predetermined area.

The second predetermined area can be determined based on different touch screens and different materials of the conductive layer through experiment. For example, the test bars having different sectional areas and being made of said conductive materials can be used to test a mobile phone of a certain model and a certain conductive material for forming the conductive layer; one of the end faces of the different test bars may contact the touch screen, and the minimal one of the end face areas of the test bars that can trigger the touch screen can be deemed as the second predetermined area.

In this embodiment, the conductive layer 210 can be provided at the inner side of the base layer of the front cover 100. In addition, the conductive layer 210 can also be provided in a window formed in the base layer and for containing the conductive layer 210 similarly to that shown in FIG. 1D. A shape of the window may correspond to the shape of the conductive layer 210.

In addition, with respect to the scenario of FIG. 2, a width of the connecting wire 212 is preferably smaller than a predetermined value. Accordingly, when the connecting wire 212 is pressed, the contact area between the conductive layer and the touch screen is smaller than the second predetermined area. In this way, even if the connecting wire portion is erroneously pressed and is in contact with the touch screen, still the touch input will not be generated. In this case, the front cover portion provided with the connecting wire 212 (for example, the portion of the base layer overlapped with the connecting wire 212) can also be designed to be made of the same elastic material as that of the front cover portion provided with the conductive region 211, so as to reduce production cost.

In another example, the width of the connecting wire 212 can be identical to the width of the conductive region 211. For example, the conductive region 211 can be formed in the same manner as the conductive region 110 does in FIG. 1A.

In addition, it should be understood that, in the scenario where the conductive region 211 cannot be in full contact with the touch screen when being pressed, the contact area between the conductive region 211 and the touch screen (preferably the minimum area) should be larger than the second predetermined area. In addition, in the case that the conductive region is not partitioned, the contact area between the conductive region 110 and the touch screen when being pressed (preferably the minimum area) should be larger than the second predetermined area.

The front cover can be transparent in each of the positions where the conductive regions 211 are located.

Figure 9:
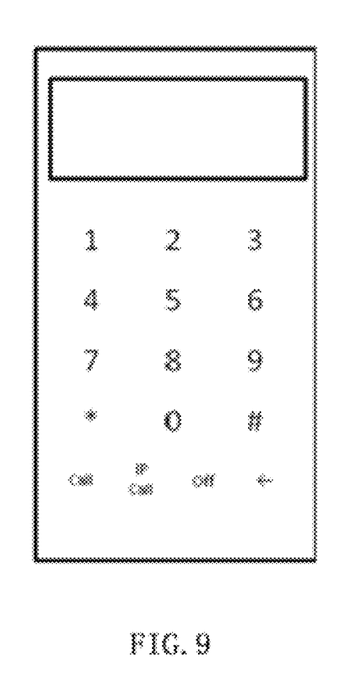
FIG. 9 shows an example of setting visible identifier on an outer side of a front cover of a protective case in position overlapping each conductive region according to an exemplary embodiment of the present invention.

In addition, the outer side of front cover is provided with visible identifiers at positions overlapped with each of the conductive regions. The identifiers can be provided in different ways, such as printing, etching, adhering and hollowing out, etc. FIG. 9 shows an example of setting visible identifier on the outside of the front cover of the protective case at position overlapping each conductive region according to an exemplary embodiment of the present invention. In this example, the identifiers identical to those of the buttons on the dial function interface are provided on the front cover, also, the front cover further include a transparent or hollowed window region, which may allow the user to view a part of the content displayed on the touch screen.

It should be understood that the conductive layer can be partially or entirely arranged at the inner side of the front cover, so as to generate the touch operation by means of the direct or indirect contact with the touch screen of the electronic device. Here, the conductive layer arranged on the inner side of the front cover is called first conductive layer.

When the conductive layer is arranged at the inner side of the front cover partially (i.e., the first conductive layer is not the entire conductive layer), the remaining conductive layer can be arranged in the other position of the front cover (hereinafter, the conductive layer arranged in position other than the inner side of the front cover of the protective case is referred to as second conductive layer). The second conductive layer is electrically connected with the first conductive layer. In this case, the sum of the areas of the first conductive layer and the second conductive layer is larger than the first predetermined area. An embodiment of such scenario will be described hereby with reference to FIGS. 3 and 4.

Figure 3:
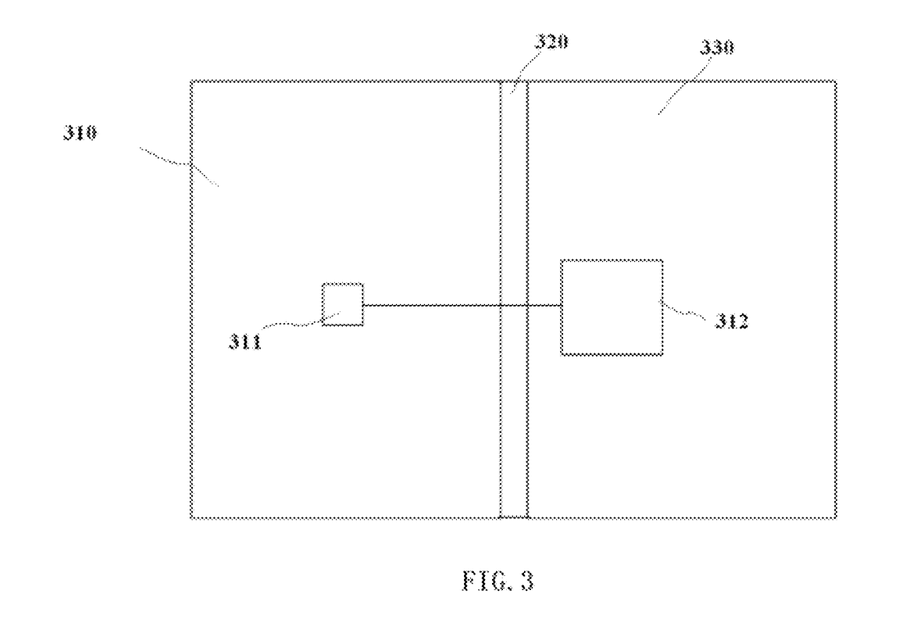
FIG. 3 shows a schematic diagram of a protective case of an electronic device according to a fifth exemplary embodiment of the present invention.

FIG. 3 shows a schematic diagram of a protective case of an electronic device according to a fifth exemplary embodiment of the present invention.

As shown in FIG. 3, a protective case 300 includes a front cover 310, a rear cover 320, and a ridge 330 connecting the front cover 310 and the rear cover 320. A first conductive layer 311 is arranged at the inner side of the front cover 310, and a second conductive layer 312 is arranged at the rear cover 320. The second conductive layer 312 is electrically connected with the first conductive layer 311. In this case, a sum of areas of the first conductive layer 311 and the second conductive layer 312 is larger than the first predetermined area.

The area of the first conductive layer 311 is larger than the second predetermined area. It should be understood that the first conductive layer 311 can also be deemed as a conductive region as described in FIG. 2.

Figure 4:
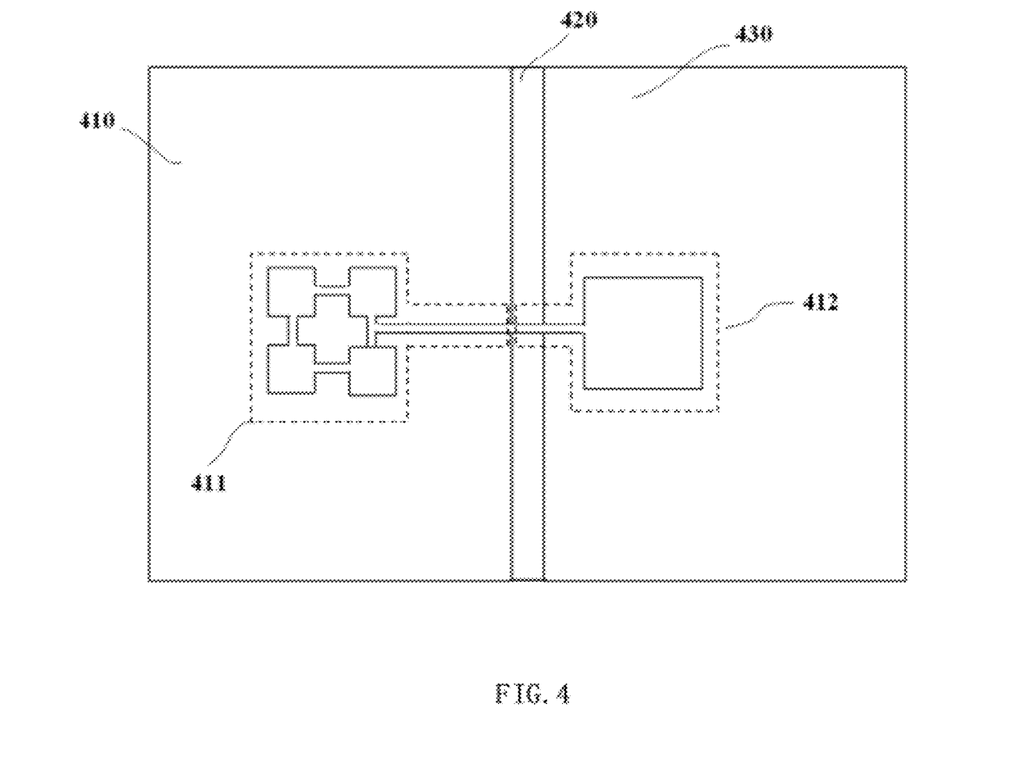
FIG. 4 shows a schematic diagram of a protective case of an electronic device according to a sixth exemplary embodiment of the present invention.

FIG. 4 shows a schematic diagram of a protective case of an electronic device according to a sixth exemplary embodiment of the present invention.

As shown in FIG. 4, a protective case 400 includes a front cover 410, a rear cover 420, and a ridge 430 connecting the front cover 410 and the rear cover 420. A first conductive layer 411 is arranged at the inner side of the front cover 410, and a second conductive layer 412 is arranged at the rear cover 420 and the ridge 430. The second conductive layer 412 is electrically connected with the first conductive layer 411. In this case, a sum of areas of the first conductive layer 411 and the second conductive layer 412 is larger than the first predetermined area.

Here, the first conductive layer 411 includes a plurality of conductive regions and connecting wire(s) for electrically connecting the adjacent conductive regions.

In this embodiment, the second conductive layer 412 includes the conductive layers provided on the rear cover 420 and the ridge 430.

It should be understood that the position of the second conductive layer is not limited to the inner sides of the rear cover 420 and the ridge 430 (for example, the second conductive layer can also be provided at outer side and/or inside of the front cover 410, the rear cover 420 and/or the ridge 430).

In one example, a part of or the entire second conductive layer may be arranged to be overlapped with the first conductive layer on the front cover. In this case, an insulating layer is arranged between the overlapped first and second conductive layers.

In another embodiment, the protective case further includes a protective layer. The protective layer is covered on the conductive layer, so as to avoid the direct contact between the conductive layer and the touch screen that may damage the touch screen. The protective layer can be realized by using the insulating material. For example, the protective layer can be realized through the rubber thin film.

In order to allow the first conductive layer to contact the touch screen through pressing, the first conductive layer can be designed not to contact the touch screen when not being pressed (as shown in the embodiments of FIGS. 1B-1D). In this case, the region of the front cover provided with the first conductive layer can all be designed to be elastic. Accordingly, any position of the first conductive layer can be pressed to contact the touch screen so as to generate the touch input.

In addition, the region of the front cover provided with the first conductive layer may also be partially designed to be elastic. For example, the region of the front cover provided with the first conductive layer as shown in the embodiments of FIGS. 1B-1D can be partially designed to be elastic; the portions of the front cover provided with the conductive regions as shown in FIGS. 2-4 can be designed to be elastic. In this scenario, only some positions of the first conductive layer can be pressed to contact the touch screen so as to generate the touch input. The front cover can be designed in the above manner when position(s) of the touch input is fixed. In this case, the visible identifier(s) can be provided on the position(s) corresponding to said fixed position(s) on the outer surface of the front cover. The identifier(s) can be used to indicate the touch input generated in said fixed position(s), such as letter, the number and function, etc.

The conductive layer of the present invention can be formed into a plate shape. For example, the conductive layer in the embodiment as described above can be formed into a plate shape. However, the present applicant is not limited to this.

Figure 5:
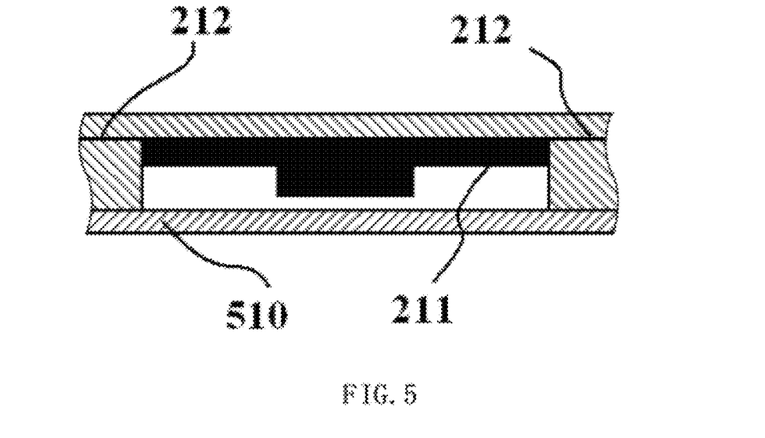
FIG. 5 shows an example of a conductive layer of a protective case according to a seventh exemplary embodiment of the present invention.

FIG. 5 shows an example of a conductive layer of a protective case according to a seventh exemplary embodiment of the present invention.

In this embodiment, an arrangement of the conductive layer can be identical to the arrangement of the conductive layer in FIGS. 2-4, wherein, the first conductive layer includes at least one conductive region, and the conductive region is used to contact the touch screen so as to form the touch input.

Each conductive region 211 in the first conductive layer is arranged in a groove formed at the inner surface of the front cover of the protective case, and the conductive region 211 includes an inward (that is, direction away from the inner surface of the front cover) protrusion.

A elastic protective layer 510 is covered on an opening of the groove, and a height of the protrusion is lower than the opening of the groove. In this case, a certain gap exists between the protrusion and the protective layer. In this way, when the conductive region 211 is not pressed, the protrusion may not contact the protective layer. The area of the protrusion is larger than the second predetermined area. In addition, hole(s) for containing the connecting wire(s) 212 is provided in the side wall of the groove, and the bottom of the groove is elastic.

When the front cover of the protective case covers the touch screen, when the conductive region 211 is pressed, the protrusion may contact the touch screen indirectly through the protective layer, so as to generate the touch input.

In another example, the protective layer may directly cover the conductive region 211. In addition, the protective layer may not be needed as well.

Although FIG. 5 shows that the groove is a square groove, the present invention is not limited thereto. The groove can be formed into other shapes. Accordingly, the conductive region 211 may also have a shape matching with the groove.

Hereinafter, an example of a configuration of the conductive layer of the protective case according to the present invention is described with reference to FIGS. 6A and 6B.

Figure 6A:
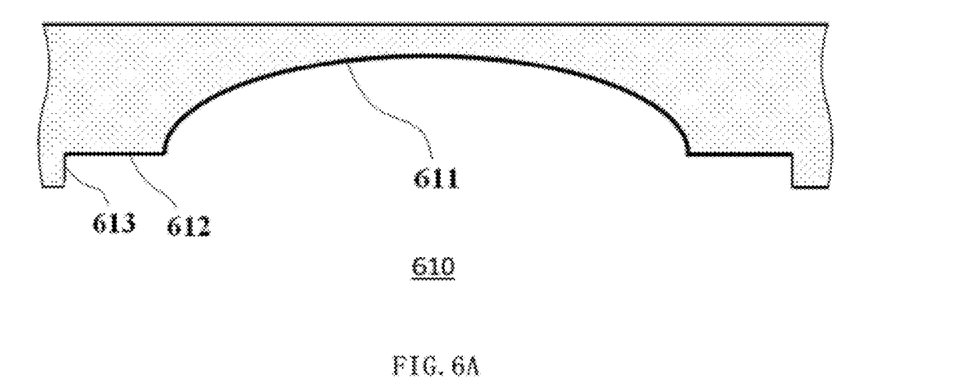
FIG. 6A shows an example of a conductive layer of a protective case according to an eighth exemplary embodiment of the present invention.

FIG. 6A shows an example of a conductive layer of the protective case according to a eighth exemplary embodiment of the present invention. FIG. 6B shows a schematic diagram of a groove being formed on the inner surface of the front cover of the protective case according to a eighth exemplary embodiment of the present invention.

In this embodiment, an arrangement of the first conductive layer can be identical to the arrangement of the first conductive layer in FIGS. 2-4. The first conductive layer includes at least one conductive region.

Figure 6B:
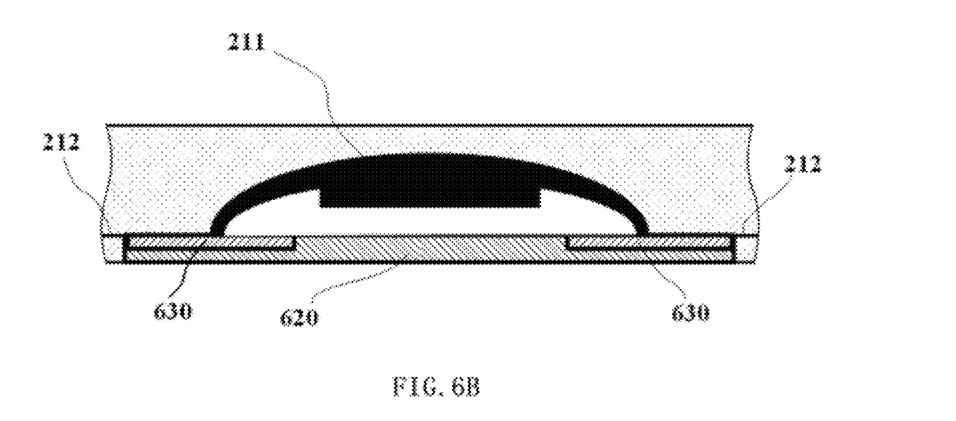
FIG. 6B shows a schematic diagram of a groove being formed on an inner surface of a front cover of the protective case according to the eighth exemplary embodiment of the present invention.

As shown in FIG. 6B, a groove 610 is formed on the inner surface of the front cover of the protective case. The groove 610 includes an arc portion 611, horizontal extension portions 612 extending towards both sides from the arc portion, and vertical extension portions 613 extending vertically down from out ends of the horizontal extension portions 612.

As shown in FIG. 6, each conductive region 211 in the first conductive layer is arranged in the groove 610, and the surface (that is, the surface of the conductive region 211 close to the top of the groove 610) of the conductive region 211 close to the inner surface of the front cover is formed into an arc shape, so as to be fittingly coupled with the groove 610. Another surface of the conductive region 211 includes a downward (that is, direction away from the inner surface of the front cover) protrusion, the height of the protrusion is lower than the horizontal extension portion 612, and may have an area larger than the second predetermined area.

The connecting wires 212 for connecting the conductive region 211 to the other part of the conductive layer extend along the horizontal extension portions 612 to the holes in the vertical extension portions 613 for containing the connecting wires 212.

The opening of the groove 610 is covered with an insulating layer 630, and the insulating layer 630 is hollowed at a position overlapped with the above protrusion. In this way, the protrusion may contact the touch screen through the hollowed position. In should be understood that the hollowed position may be larger than or equal to the area of the protrusion. In addition, a protective layer 620 is arranged at the hollowed position on the insulating layer 630. In other words, the protective layer 620 faces the protective layer and is surrounded by the insulating layer 630. The insulating layer 630 is coupled to the horizontal extension portions 612 and the vertical extension portions 613 of the groove 610.

Although a part of the protective layer is provided below the insulating layer, no protective layer may be arranged below the insulating layer.

The connecting wires 212 for connecting the conductive region 211 to the other part of the conductive layer are arranged between the insulating layer 630 and the horizontal extension portion 612.

In another embodiment, the protective layer 620 may not be used. In this scenario, the height of the protrusion is lower than the opening of the groove 610 (that is, the lower end of the vertical extension portion 613).

Figure 7:
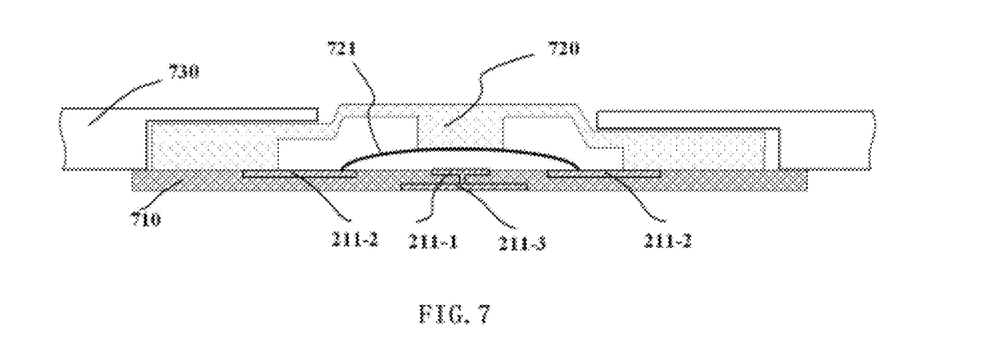
FIG. 7 shows an example of a conductive layer of a protective case according to a ninth exemplary embodiment of the present invention.

FIG. 7 shows an example of a conductive layer of a protective case according to a ninth exemplary embodiment of the present invention.

In this embodiment, an arrangement of the first conductive layer can be identical to the arrangement of the first conductive layer in FIGS. 2-4. The first conductive layer includes at least one conductive region.

As shown in FIG. 7, a support plate 710 is formed at the inner side of the front cover of the protective case; the first conductive layer is formed on the support plate 710; each conductive region 211 of the first conductive layer includes a first portion 211-1, a second portion 211-2 and a third portion 211-3.

The first portion 211-1 and the second portion 211-2 are arranged at a side of the support plate facing the inner surface of the front cover. The third portion 211-3 is arranged at the other side of the support plate so as to contact the touch screen. Moreover, the connecting wire(s) connecting different conductive regions (for example, the connecting wire 212) is also arranged at the side of the support plate 710 facing the inner surface of the front cover. The first portion 211-1 and the third portion 211-3 are electrically connected. The first portion 211-1 and the third portion 211-3 can be integrated, and can also be formed independently. The area of the third portion 211-3 is larger than the second predetermined area and is smaller than the first predetermined area.

A metal dome key 720 is arranged above the first portion 211-1; the second portion 211-2 surrounds the first portion 211-1 separately and is connected to the bottom of a metal dome 721 in the dome keys 720; the top of the metal dome 721 is positioned above the first portion 211-1. In other words, when the metal dome key 720 is pressed, the top of the arc-shaped metal dome 721 is pressed so as to contact the first portion 211-1. In this case, the first portion 211-1 and the second portion 211-2 are electrically connected.

Normally, the bottom of the metal dome 721 is fixed to the second portion 211-2. In another embodiment of the present invention, the bottom of the metal dome 721 is movable, and the bottom of the metal dome 721 couples to the second portion 211-2 by contacting. Specifically speaking, when the metal dome key 720 is pressed, the arc-shaped metal dome 721 is gradually flattened and the bottom thereof slides along the second portion 211-2; when the metal dome key 720 is completely pressed down (for example, when the arc-shaped metal dome 721 is completely flattened), the metal dome 721 is in contact with the first portion 211-1, so that the metal dome 721 in the metal dome keys 720 may connect the first portion 211-1 and the second portion 211-2.

The metal dome key 720 is embedded in the front cover such that the key is able to be pressed from the outer side of the front cover. For example, the front cover may also include the base layer 730 as described above. The support plate 710 is coupled to the inner side of the base layer, the metal dome key 720 can be embedded in the base layer so as to be pressed from the outer surface of the base layer. In addition, the front cover may also include a leather layer. For example, the front cover may include a leather layer covering the outer surface of the base layer and/or a leather layer covering the portion not coupled to the support plate on the inner surface of the base layer. The leather layer can be made of artificial leather or natural leather.

Figure 10:
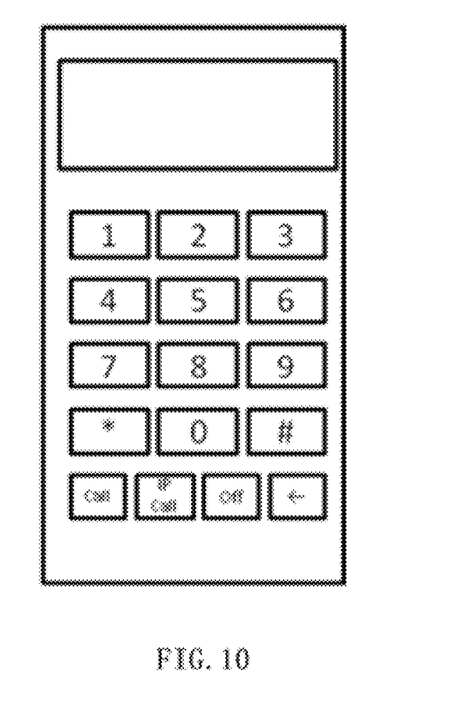
FIG. 10 shows an example of setting metal dome keys on a protective case according to an exemplary embodiment of the present invention.

In addition, the visible identifier can be provided on metal dome key 720. The identifier can be used to indicate the input generated by the metal dome key 720 after being pressed, such as letter, the number and the function, etc. FIG. 10 shows an example of setting metal dome keys on the protective case according to an exemplary embodiment of the present invention.

In addition, in another embodiment, the other spring-back key can be used to replace the metal dome key, thus the present invention is not limited to the metal dome key.

In the embodiment as shown in FIG. 7, in order to allow the first conductive layer to contact the touch screen through pressing, a region of the front cover provided with the first conductive layer can be designed as follows: when not being pressed, a first portion of the first conductive layer (for example, the second portion 211-2 in FIG. 7) may not contact the touch screen, a second portion of the first conductive layer (for example, the first portion 211-1 and the third portion 211-3 being electrically connected in FIG. 7) may contact the touch screen, and above two portions may not be electrically connected; when being pressed, the first portion of the first conductive layer may not contact the touch screen, and above two portions may be electrically connected. In order to perform touch input on the touch screen, the area of the conductive layer should be larger than the first predetermined area. Therefore, even if the conductive layer contacting the touch screen exists when the pressing is not performed, the touch input still cannot be generated. When the above first portion and second portion are electrically connected, the second portion contacting the touch screen may generate the touch input.

In another embodiment of the present invention, the front cover of the protective case is provided with key(s) at position(s) overlapped with physical key(s) (such as the Home key) of the front of the electronic device. In this way, when covering the front cover over the touch screen, the touch input can be realized on the touch screen, also, the physical key(s) of the electronic device can be used as well.

Figure 11:
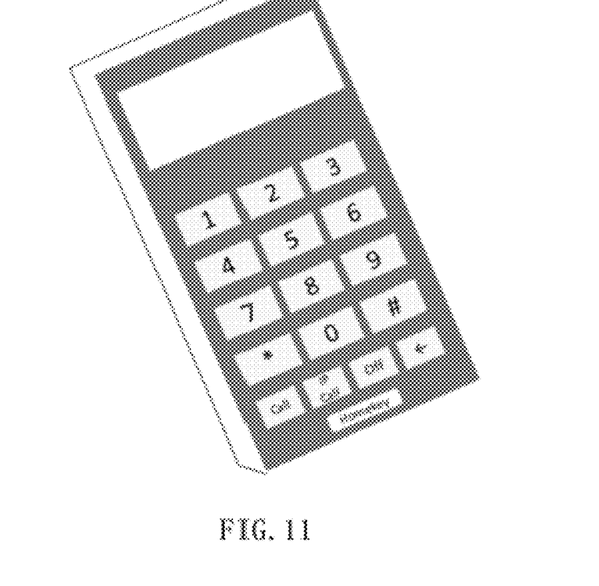
FIG. 11 shows an example of providing keys on a front cover of a protective case according to an exemplary embodiment of the present invention.

FIG. 11 shows an example of providing keys on the front cover of the protective case according to an exemplary embodiment of the present invention. FIG. 10 shows the protective case of the mobile phone. A key is provided on the front cover of the protective case at a position overlapped with a physical key (Home key) of the mobile phone, that is, the "Homekey" as shown in the drawings.

In another embodiment of the present invention, the protective case further includes an interface for connecting the ground terminal of the electronic device, and the conductive layer is electrically connected with the interface. Regarding some electronic devices having external ground interface, the conductive layer can be electrically connected to the grounding through the above interface. In this case, the object touching the touch screen may have a sufficiently low potential, and the area of the conductive layer is not required to be larger than the first predetermined area. For example, in the embodiments of FIGS. 3 and 4, the second conductive layer 312 is not needed. However, the area of each conductive region 211 should still be larger than the second predetermined area.

It should be understood that, when the protective case is mounted on the electronic device having touch screen, a new electronic device having said protective case can be formed. Said protective case can be mounted to the electronic device in various manners.

The improvement to the protective case in the present invention does not lie in the mounting of the protective case. In order to avoid obscuring the present invention, the description related to the mounting of the protective case will be omitted herein.

Figure 8:
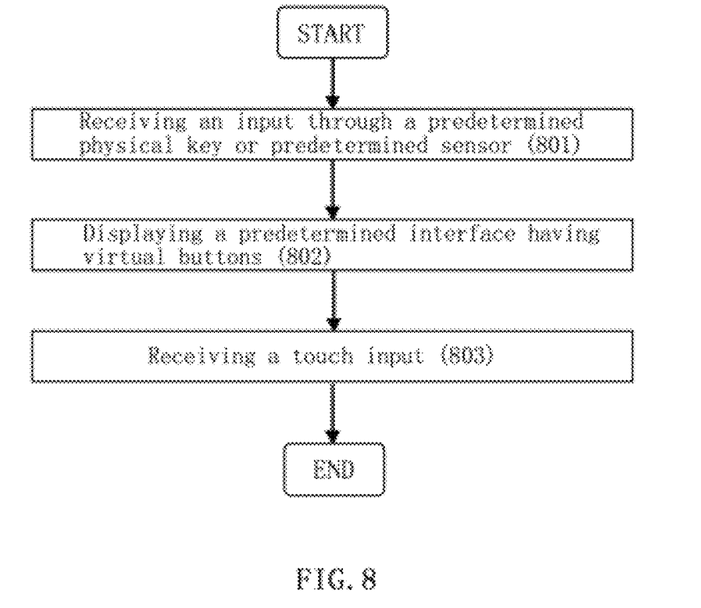
FIG. 8 shows a flow diagram illustrating a method of performing input on the electronic device having a capacitive touch screen through a protective case according to an exemplary embodiment of the present invention.

FIG. 8 shows a flow diagram illustrating a method of performing input on the electronic device having a capacitive touch screen through the protective case according to an exemplary embodiment of the present invention. When performing said method, the protective case is mounted on the electronic device, and the front cover of the protective case is covered on the touch screen.

As shown in FIG. 8, in step 801, a request for performing a touch input by using the protective case is received. For example, an input through the predetermined physical key or predetermined sensor may be received as the request.

In one example, when the electronic device is a mobile phone, the predetermined physical key may be located on the lateral side (such as the volume key and the camera key, etc.), and can also be the key provided on positions overlapped with the key (for example, the Home key) of the front of the electronic device on the protective case as described above. Input through the predetermined physical key may be, for example, detecting that the mobile phone is not put close to the ear to answer the phone call by distance sensor and/or acceleration sensor.

In step 802, a predetermined interface having at least one touch function region is displayed in response to the request. In other words, the electronic device enters a predetermined mode adaptive to the protective case according to the present invention through step 801.

In order to perform input through the front cover of the protective case, the position of the touch function region required to be triggered through the protective case should be within the range covered by the first conductive layer.

In addition, regarding the scenario where the first conductive layer is partitioned into a plurality of conductive regions (such as the conductive regions 211), the position of the touch function region required to be triggered through the protective case may correspond to a conductive region respectively. In other words, the projection of a portion, capable of contacting the touch screen, of the conductive region corresponding to the touch function region on the touch screen should fall within the touch function region. In this way, the portion of the conductive region having the corresponding touch function region capable of contacting the touch screen (for example, the protrusions in FIGS. 5-7) can contact the corresponding touch function region, so as to trigger the touch function region.

In addition, regarding the scenario where the first conductive layer is not partitioned into a plurality of conductive regions (i.e. only one conductive region), when the visible identifiers are provided on the front cover, the positions of the touch function region which should be triggered by the protective case correspond to the respective identifiers one-by-one. In other words, the projection of identifier corresponding to the touch function region on the touch screen should fall within the touch function region.

It should be understood that, according to the concept of the present invention, regarding the scenario where the first conductive layer is not partitioned into a plurality of conductive regions, when the visible identifiers are not provided on the front cover of the protective case and when the region provided with the first conductive layer is transparent, it is only needed to set the position of the touch function region required to be triggered through the protective case within the range covered by the first conductive layer.

The touch function region can be visually displayed (for example, displaying the touch function region as button), and can also be invisible. For example, as mentioned above, when the front cover of the protective case is partially or entirely transparent, the touch function region can be displayed in a visible manner (such as button); when the visible identifiers are provided on the front cover of the protective case, the touch function region can be displayed invisibly so as to save power. In should be understood that, "not displaying the touch function region" means that the touch function region cannot be identified visibly, which does not means that contents are not displayed in the touch function region.

The contents mentioned above (that is, whether to set the visible identifier, whether to allow the front cover to be transparent, whether to display the touch function region, and the position of the touch function region) are only used to explain one fact: how to facilitate the user when he/she wishes to press the desired touch function region through the front cover. The present invention is not limited to scenarios as mentioned above. Any other means that can allow the user to press the desired touch function region through the front cover would be available. For example, when the front cover is transparent and the touch function region is displayed, the visible identifiers can be provided on the front cover, and the visible identifiers may correspond to the touch function region.

For example, the predetermined interface can be a dial interface of a phone application, and the touch function regions may include the touch function regions for inputting the dial information and performing the dial function. For example, the dial interface may display a plurality of virtual buttons for dialing (the buttons are used as the touch function regions), and the display position of each virtual button (for example, number "1") may correspond to one conductive region on the front cover of the protective case. In this way, by pressing the position on the front cover of the protective case overlapped with the conductive region, one can press the virtual button. In should be understood that, said touch function region can also be invisible.

In step 803, a touch input generated by the contact between the conductive region and the virtual button is received, wherein the contact is caused by pressing the front side of the protective case in a position overlapped with the conductive region. For example, as for the virtual button "1", by pressing the position on the front side of the protective case corresponding to the position of said button, the conductive region in said position may contact the virtual button "1", so as to generate the input of touching the virtual button "1".

It will be understood that when an element or layer is referred to as being "formed on," another element or layer, it can be directly or indirectly formed on the other element or layer. That is, for example, intervening elements or layers may be present. In contrast, when an element or layer is referred to as being "directly formed on," to another element, there are no intervening elements or layers present. Other words used to describe the relationship between elements or layers should be interpreted in a like fashion (e.g., "between," versus "directly between," "adjacent," versus "directly adjacent," etc.).

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

While the present invention has been particularly shown and described with reference to exemplary embodiments thereof, it will be understood by those of ordinary skilled in the art that various changes in form and details may be made therein without departing from the spirit and scope of the present invention as defined by the following claims.

What is claimed is:

1. A protective case for protecting an electronic device, the protective case comprising:
   a front cover for covering a touch screen of the electronic device;
   a conductive layer for generating a touch input on the touch screen; and
   a protective layer,
   wherein the conductive layer comprises at least one first conductive layer disposed at the front cover, and a groove is formed in an internal surface of the front cover,
   wherein the first conductive layer is disposed between the protective layer and the internal surface of the front cover,
   wherein the first conductive layer comprises a plurality of conductive regions and a connecting wire for electrically connecting conductive regions adjacent to each other from among the plurality of conductive regions,
   wherein a support plate is formed on the internal surface of the front cover, and the first conductive layer is formed on the support plate, each of the conductive regions of the first conductive layer comprising a plurality of portions,
   wherein the front cover comprises a non-conductive material layer, a base layer, and the support plate, the base layer being disposed between the non-conductive material layer and the support plate, and
   wherein a key is embedded in the non-conductive material layer and the base layer such that at least two portions of the plurality of portions are electronically connected to each other when the key is pressed.

2. The protective case of claim 1, wherein a region of the front cover where the first conductive layer is located is partially or entirely elastic.

3. The protective case of claim 1, wherein the conductive layer has an area that is greater than an area of a predetermined first region.

4. The protective case of claim 1, wherein the conductive layer further comprises a second conductive layer that is disposed at a position different from that of the first conductive layer.

5. The protective case of claim 1, wherein an area of each of the plurality of conductive regions is less than an area of the at least one first conductive layer.

6. The protective case of claim 1, wherein the plurality of portions comprise a first portion, a second portion, and a third portion, and
   wherein the first portion, the second portion, and the connecting wire are arranged at a first side of the support plate, and the third portion is arranged at a second side of the support plate which is opposite to the first side.

7. The protective case of claim 6, wherein the first portion and the third portion are electrically connected to each other, and the second portion is electrically connected to the connecting wire.

8. The protective case of claim 6, wherein the key is arranged above the first portion, and the first portion and the second portion are electrically connected to each other via the key when the key is pressed.

9. The protective case of claim 1, wherein a visible identifier is provided on the key.

10. The protective case of claim 1, wherein the front cover is partially or entirely transparent.

11. The protective case of claim 1, further comprising:
a rear cover, connected to the front cover with a ridge, for covering rear areas of the electronic device.

12. A protective case for protecting an electronic device, the protective case comprising:
a front cover for covering a touch screen of the electronic device; and
a conductive layer for generating a touch input on the touch screen,
wherein the conductive layer comprises at least one first conductive layer disposed at the front cover, and a groove is formed in an internal surface of the front cover,
wherein the first conductive layer comprises a plurality of conductive regions and a connecting wire for electrically connecting conductive regions adjacent to each other from among the plurality of conductive regions,
wherein a support plate is formed on the internal surface of the front cover, and the first conductive layer is formed on the support plate, each of the conductive regions of the first conductive layer comprising a plurality of portions,
wherein the front cover comprises a non-conductive material layer, a base layer, and the support plate, the base layer being disposed between the non-conductive material layer and the support plate,
wherein a key is embedded in the non-conductive material layer and the base layer such that at least two portions of the plurality of portions are electronically connected to each other when the key is pressed,
wherein at least one from among the plurality of conductive regions comprises a protrusion disposed in the groove that is formed in the internal surface of the front cover,
wherein at least one conductive region has an arc-shaped surface, and the groove comprises:
an arc portion formed as an arc shape matching with the arc-shaped surface of the at least one conductive region;
horizontal extension portions extending outwards from an edge of the arc portion; and
vertical extension portions extending outwards from an end portion of the horizontal extension portions, and
wherein an inlet of the groove is covered by an insulating layer, and the insulating layer is hollowed to cover the protrusion included in the groove and coupled to the horizontal extension portions and the vertical extension portions.

13. The protective case of claim 12, wherein the connecting wire is located between the insulating layer and the horizontal extension portions, and the horizontal extension portions are provided in a hole for connecting the connecting wire.

14. The protective case of claim 12, further comprising a protective layer disposed in a hollowed position of the insulating layer.

15. The protective case of claim 12, wherein an area of the protrusion is greater than a predetermined threshold area that is a minimum contact area on the touch screen for the conductive layer to generate the touch input.

16. A protective case for protecting an electronic device, the protective case comprising:
a front cover for covering a touch screen of the electronic device; and
a conductive layer for generating a touch input on the touch screen,
wherein the conductive layer comprises at least one first conductive layer disposed at the front cover, and a groove is formed in an internal surface of the front cover,
wherein the first conductive layer comprises a plurality of conductive regions and a connecting wire for electrically connecting conductive regions adjacent to each other from among the plurality of conductive regions,
wherein a support plate is formed on the internal surface of the front cover, and the first conductive layer is formed on the support plate, each of the conductive regions of the first conductive layer comprising a plurality of portions,
wherein the front cover comprises a leather layer, a base layer, and the support plate, the base layer being disposed between the leather layer and the support plate, and
wherein a key is embedded in the leather layer and the base layer such that at least two portions of the plurality of portions are electronically connected to each other when the key is pressed.

* * * * *